United States Patent [19]

Meyerhofer et al.

[11] Patent Number: 5,095,487
[45] Date of Patent: Mar. 10, 1992

[54] SYSTEM FOR GENERATING PLURALITIES OF OPTICAL PULSES WITH PREDETERMINED FREQUENCIES IN A TEMPORALLY AND SPATIALLY OVERLAPPED RELATIONSHIP

[75] Inventors: David D. Meyerhofer, Spencerport; Ansgar W. Schmid, Honeoye Falls; Yung-ho Chuang, Rochester, all of N.Y.

[73] Assignee: The University of Rochester, Rochester, N.Y.

[21] Appl. No.: 627,661

[22] Filed: Dec. 14, 1990

[51] Int. Cl.$^5$ .............................................. H01S 3/082
[52] U.S. Cl. ........................................ 372/23; 372/25; 372/102; 372/103; 372/18; 372/97
[58] Field of Search ................ 372/25, 23, 70, 18, 372/102, 103, 97; 455/608, 609; 330/4, 3; 350/162.12, 162.17

[56] References Cited

U.S. PATENT DOCUMENTS

| | | | |
|---|---|---|---|
| 4,200,846 | 4/1980 | Stark, Jr. et al. | 372/25 |
| 4,588,957 | 5/1986 | Balant et al. | 350/162.17 |
| 4,655,547 | 4/1987 | Heritage et al. | 350/162.11 |
| 4,685,107 | 8/1987 | Kafka et al. | 372/25 |
| 4,737,958 | 4/1988 | Sizer, II | 372/25 |
| 4,764,930 | 8/1988 | Bille et al. | 372/25 |
| 4,914,663 | 4/1990 | Basu et al. | 372/18 |
| 4,928,316 | 5/1990 | Heritage et al. | 455/608 |

OTHER PUBLICATIONS

"Programmable Femtosecond Pulse Shaping by Use of a Multielement Liquid-Crystal Phase Modulator", *Optics Letters*, vol. 15, No. 6 (pp. 326-328), Mar. 15, 1990.
"Compression of Amplified Chirped Optical Pulses", Donna Strickland, G. Mourou, vol. 56, #3, *Optics Communications*, Dec. 1, 1985.

*Primary Examiner*—William L. Sikes
*Assistant Examiner*—Susan S. Morse
*Attorney, Agent, or Firm*—Martin Lukacher

[57] ABSTRACT

Ultra short (pico second and shorter) laser pulses having components of different frequency which are overlapped coherently in space and with a predetermined constant relationship in time, are generated and may be used in applications where plural spectrally separate, time-synchronized pulses are needed as in wave-length resolved spectroscopy and spectral pump probe measurements for characterization of materials. A Chirped Pulse Amplifier (CPA), such as a regenerative amplifier, which provides amplified, high intensity pulses at the output thereof which have the same spatial intensity profile, is used to process a series of chirped pulses, each with a different central frequency (the desired frequencies contained in the output pulses). Each series of chirped pulses is obtained from a single chirped pulse by spectral windowing with a mask in a dispersive expansion stage ahead of the laser amplifier. The laser amplifier amplifies the pulses and provides output pulses with like spatial and temporal profiles. A compression stage then compresses the amplified pulses. All the individual pulses of different frequency, which originated in each single chirped pulse, are compressed and thereby coherently overlapped in space and time. The compressed pulses may be used for the foregoing purposes and other purposes wherien pulses having a plurality of discrete frequency components are required.

18 Claims, 2 Drawing Sheets

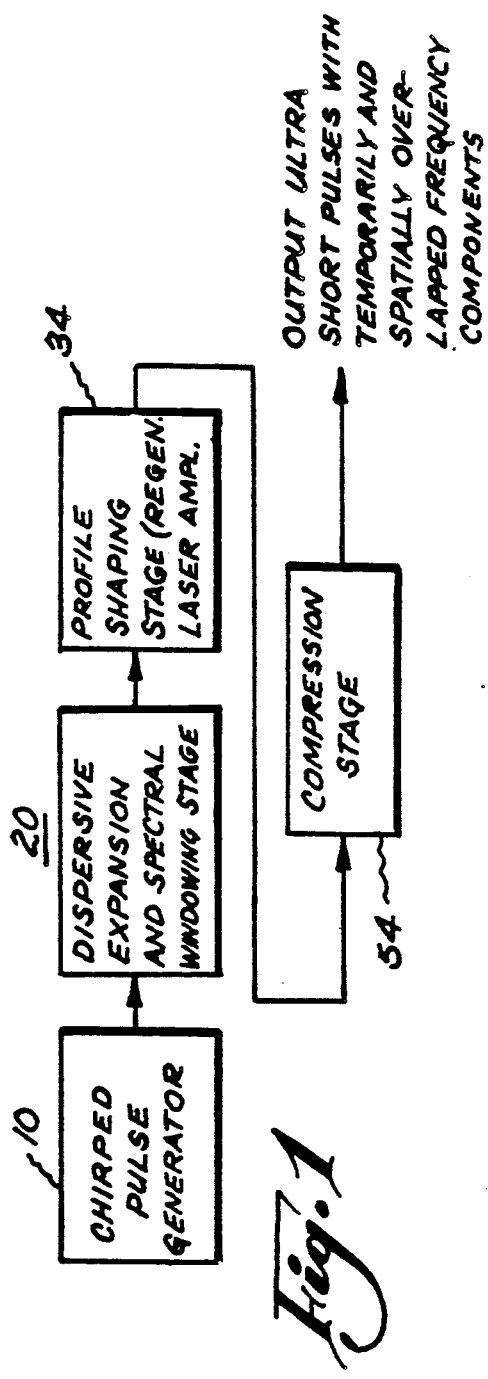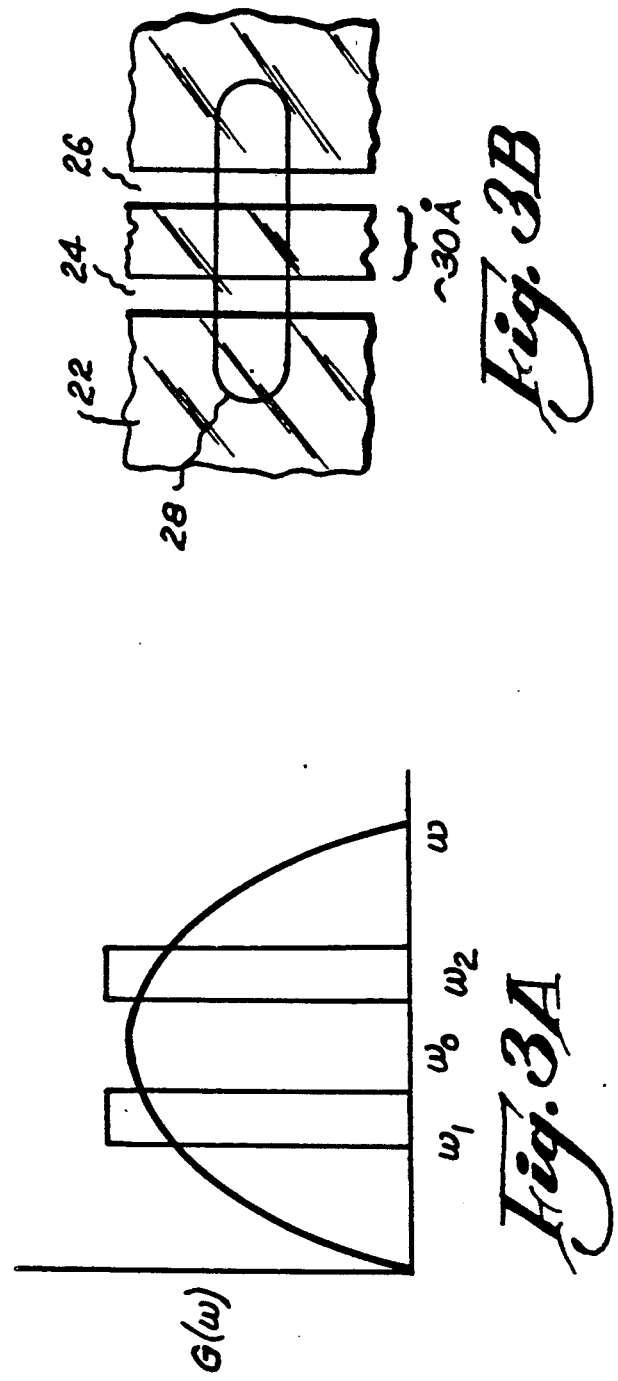

SYSTEM FOR GENERATING PLURALITIES OF OPTICAL PULSES WITH PREDETERMINED FREQUENCIES IN A TEMPORALLY AND SPATIALLY OVERLAPPED RELATIONSHIP

The U.S. Government has rights in this invention pursuant to Contract DE-FC03-85DP40200 between the University of Rochester and the Department of Energy, Office of Inertial Fusion.

DESCRIPTION

The present invention relates to systems for generating ultra-short, high-intensity, spatially overlapped and temporally arranged in the desired time relationship (which may be in overlapped relationship) laser pulses, each pulse having a different frequency component and each pulse having like spatial and temporal profiles. More particularly, the invention relates to a system for generating such temporally and spatially overlapped pulses from a single chirped pulse broken up into a series of chirped pulses, each with a different central frequency, which are amplified and then compressed so that they overlap in space and in time.

The invention is especially suitable for use in the generation of pulses having selected frequency components which are of different frequency, as in wavelength resolved spectrometry and spectral pump probe measurements; the latter to characterize materials for their reflectivity, non-linear susceptibility (as by four wave mixing techniques, coherent anti-Stokes Raman scattering (CARS)) and coherent Stokes Raman scattering (CSRS). The invention is also useful in beat-wave accelerators for providing electron accelerating fields in plasmas.

It has been proposed to obtain multiple, temporally shaped pulses from a chirped pulse by spectral windowing in a diffractive stage which provides access to the frequency spectrum of the chirped pulse. See Heritage, et al., U.S. Pat. No. 4,655,547 issued Apr. 7, 1987 and U.S. Pat. No. 4,928,316 issued May 22, 1989 and an article by A. M. Weiner, et al. appearing in Optics Letters, Volume 15, No. 6 (pages 326-328, Mar. 15, 1990). The purpose of spectral windowing as described in the Heritage patent and the Weiner, et al. article is to provide a modulated output pulse with different temporal shape depending upon the information to be carried by the modulated output. No attention is paid to the spatial characteristics of the output pulse (its profile, for example, with respect to the center of the beam). Thus, it is to be expected that the spatial characteristics of the output are indeterminate and are perturbed by variations in shape of the input pulse and the variations in the modulation process, which is accomplished by adjusting the mask providing the spectral windows. It is desirable for many applications, particularly in metrology, such as wave-length resolved spectroscopy, that pulses of different frequency have the same profile so that they are overlapping in space. It is also desirable that the pulses of different frequency overlap in time. A single pulse with a plurality of frequency components may be desired. Such a pulse or sequence of pulses, each having the same frequency composition, is then used in the experiment, to make the measurement. The purpose of generating such spatially and temporarily coherent pulses runs contrary to the purpose of a modulation system as in the Heritage, et al. patents and the Weiner, et al. article wherein it is desired to impose higher degrees of variation due to the temporal modulation so as to generate signals having greater information carrying capability. Spectral windowing involves the use of chirped (broadband) pulses which may vary from pulse to pulse in spatial intensity distribution. In order to provide spatial and temporal coherency, it is necessary to remove variation in spatial profile of the chirped pulses; thus both eliminating variations spatially and temporally in the pulses to provide frequency-separated pulses which are overlapped exactly in space and time. Thus, frequency-separated experiments can be carried out with a high degree of accuracy.

It has been discovered, in accordance with this invention, that profile shaping so as to enable pulses having different frequency to be overlapped spatially and temporally, can be obtained by using a profile shaping stage to optically process short laser pulses of different frequency which are obtained from a chirped laser pulse by spectral windowing. These pulses may be overlapped in time by a compression stage following the profile shaping stage. The profile shaping stage is preferably a chirped pulse amplifier which is capable of amplifying pulses having a broad frequency spectrum (short pulses). Preferably a regenerative laser amplifier is used to amplify the pulses. The spatial characteristics of the output pulses of a regenerative amplifier are determined not by the spatial characteristics of the input beam of pulses which seed the amplifier, rather the regenerative amplifier alone determines the spatial mode of the pulse. It is the cavity structure of the regenerative amplifier (the shape of its mirrors and apertures) which fixes the mode structure of the laser pulse circulating within and exiting the amplifier. A typical pulse undergoes up to hundreds of passes through the laser medium in the amplifier. The pulse, therefore, loses the information as to its original spatial profile and takes on the profile determined by the cavity structure of the regenerative amplifier. The non-uniform gain profile of the amplifying gain medium is used to advantage in implementing the invention by selecting the frequencies of the pulses relative to the frequency at the gain center of the laser medium in order to predetermine the relative energy of the exiting pulses. Complete symmetry of the injected pulses about the gain center of the regenerative amplifier's gain medium ensures that the pulses of different frequency undergo identical amplification and gain narrowing. The output signal from the regenerative amplifier and also at the output of the system is therefore spatially isolated from the input to the system. The regenerative amplifier provides high intensity, short pulses. The gain and increase in intensity is enhanced, in accordance with the invention, by expanding the duration of the input pulses which seed the amplifier thereby operating the amplifier for efficient extraction of energy from the gain medium. The gain medium may be selected so as to provide a large bandwidth to enable the generation of overlapping, extremely short (e.g. femto-second range) pulses by the use of a large bandwidth gain medium such as Ti-sapphire.

Accordingly, it is the principal objective of the present invention to provide an improved system for the generation of high intensity, spatially overlapped, ultra-short laser pulses of different frequency which pulses may also be temporally overlapped.

It is a more specific objective of the invention to provide an improved system for the generation of ultra-short pulses of different frequencies having the same spectral profile so as to enable them to be coherently overlapped in space and, if desired, in time.

It is a further objective of the present invention to provide a system for generating frequency-separated pulses which are overlapped exactly in space and can be overlapped exactly in time and which are especially suitable for use in wave-length resolved spectroscopy and other experiments and measurement techniques requiring different, discrete frequency components in the same optical pulse.

Briefly described, the invention provides a chirped pulse laser system by which a short pulse having a plurality of frequency components which are spatially overlapped and which are in predetermined temporal relationship with each other, are generated. The system uses means for generating chirped laser pulses having a bandwidth which exceeds the entire spectral range of the frequency components. First means are provided for optically processing a chirped pulse to derive a plurality of chirped pulses in each of which different ones of said frequency components are contained exclusively of the other frequencies in the bandwidth. Second means are provided for optically processing the pulses from the first means, such that each frequency component has the same spatial profile. Third means are then provided for optically processing each plurality of pulses from the second means for compression thereof into one or more short pulses, each containing the plurality of pulses from the second means in spatially overlapping relationship and in predetermined temporal relationship.

The foregoing and other objects, features and advantages of the invention, as well as a presently preferred embodiment thereof, will become more apparent from a reading of the following description in connection with the accompanying drawings in which:

FIG. 1 is a block diagram of a chirped pulse laser system embodying the invention;

Figure 2:
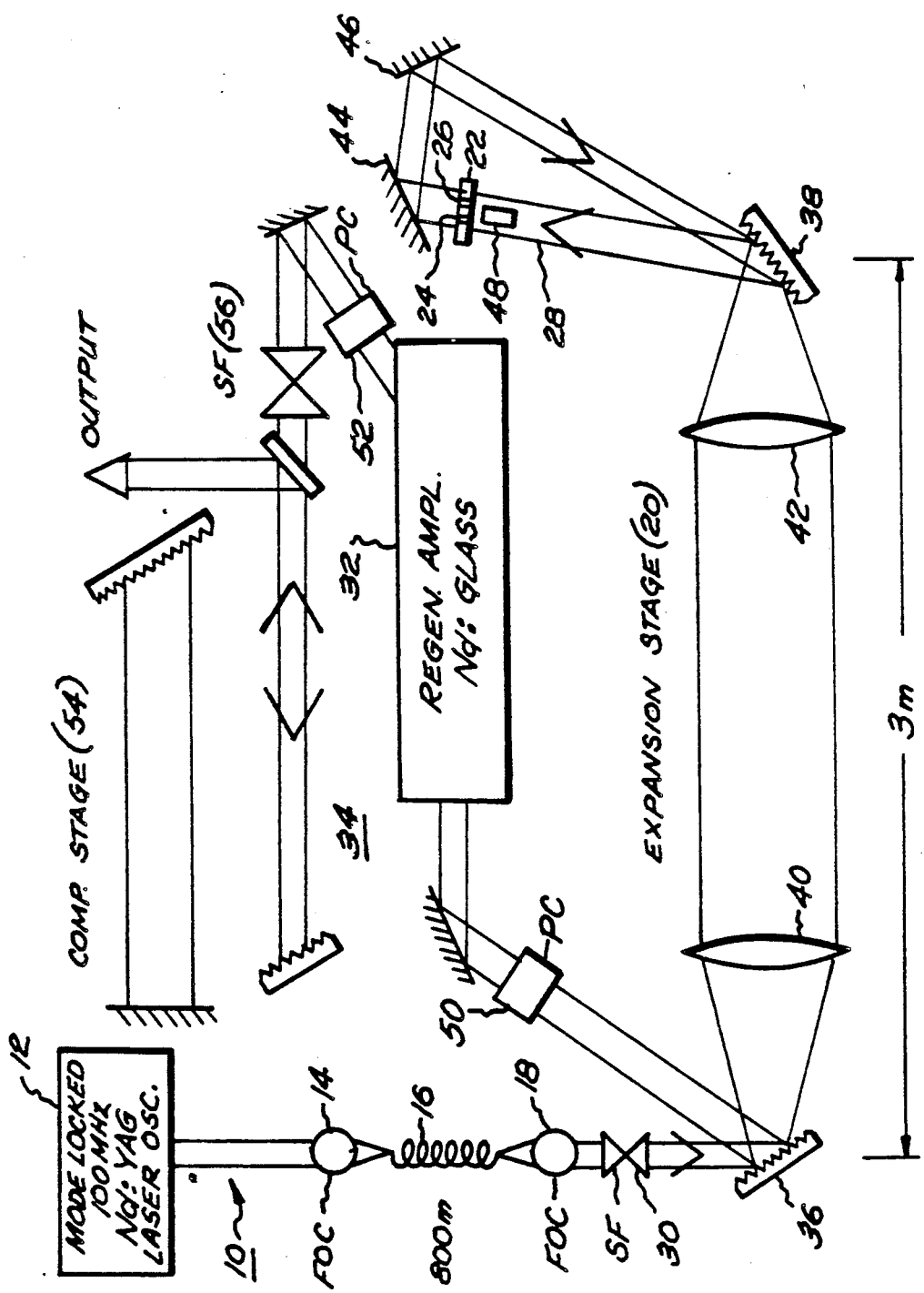
FIG. 2 is a diagram schematically showing a chirped-pulse laser system in accordance with the presently preferred embodiment of the invention.

FIG. 3A is a curve illustrating the gain/frequency G (w) vs. w characteristic of the laser gain medium in the regenerative amplifier of the system shown in FIG. 2 and the relationship of the frequencies of two pulses which are spatially overlapped to provide each short output pulse by the compression stage thereof; and FIG. 3B is a fragmentary front view of the mask used in the system shown in FIG. 2.

Referring more particularly to FIG. 1, there is shown a chirped pulse generator which provides short pulses of broad bandwidth. This generator may be provided by a mode-locked oscillator, such as the mode locked Nd:YLF laser oscillator 12 shown in FIG. 2 which feeds the pulses at, for example, 100 MHz repetition rate through a fiber optic coupler 14 (FOC) into an optical fiber (for example, 800 meters in length) in which the pulse from the oscillator undergoes self phase modulation (bandwidth) and group velocity dispersion. The group velocity dispersion in the fiber increases the pulse length to greater than 100 ps, suitably 150 ps from the pulses produced in the oscillator 12. The pulses produced by the oscillator 12 may, for example, be 50 ps in duration.

Other optical pulse generators, for example, dye lasers, which provide pulses of bandwidth that exceeds the entire spectral range of the desired frequency components, may be used.

The chirped pulses are then applied from the generator 10 to a dispersive expansion and spectral windowing stage 20. This stage expands the duration of the pulses. It also extends the pulses spatially so that the different frequency components of the output pulses are spread across a mask 22, a portion of which is shown in FIG. 3B. The mask has windows 24 and 26 through which the spatially spread beam is transmitted while the remainder of the beam is reflected. Instead of a reflective surface, an absorbing surface may be provided in the mask. Reflective surfaces are preferred since they are easy to fabricate and since, because of slight misalignments of the mask from perpendicularity to the incoming beam, which are unavoidable in fabricating the system, the beam is not reflected back along the same path as the incoming beam to the mask 22.

The spatial filter 30 places a spectral Fourier transform plane of the chirped pulse on a plane exactly at the location of the mask 22. The mask provides spectral windowing and derives from each chirped pulse a plurality of pulses equal to the number of mask openings, preferably in pairs of longer and shorter wave length with respect to the gain center of the laser medium in a regenerative amplifier 32 which provides the spatial intensity shaping stage 34 of the system. In the embodiment illustrated in FIG. 2, the gain medium is Nd:Glass. The gain medium determines the bandwidth handled by the amplifier 32 and, through the process of gain narrowing, the duration of the output pulses. Nd:Glass is capable of amplifying chirped pulses with a bandwidth corresponding to pico-second-range output pulses. If shorter pulses are desired, for example, in the femtosecond range, a larger bandwidth gain medium, such as Ti-saphire, may be used. If a dye laser is used as source 10, a synchronously pumped dye laser amplifier may be used as element 32.

The gain/frequency response of the amplifier 32 is shown in FIG. 3. Two frequency components which are passed by spectral windowing in the mask 22 are illustrated as chirped pulses having their center frequency at omega$_1$ and omega$_2$. In other words, two independent chirped pulses are shown. In the embodiment shown in FIG. 2 and as illustrated in FIGS. 3A and 3B, the frequency components occupy a bandwidth of approximately 7 Å separated by approximately 30 Å; the center frequency of the lower frequency component being approximately minus 15 Å from the gain center of the medium of the regenerative amplifier 32 and the higher frequency component having its center frequency omega$_2$ approximately 15 Å above the gain center of the regenerative amplifier. The frequency components are therefore symmetrically disposed about the gain center. The gain vs. frequency response is essentially Gaussian and symmetrical about the gain center frequency. Thus, the frequency components undergo identical amplification and gain narrowing as they execute up to hundreds of passes between the end mirrors of the regenerative amplifier cavity. The spatial mode of the amplification is determined by the amplifier cavity characteristics; thus the pulses undergo same gain narrowing and each pulse has the same spatial profile. In other words, the intensity of both pulses varies in the same manner (symmetrically) radially about the spatial center of the beam of pulses, which is along the optical axis of the system. In addition to spatial profile shaping, the amplifier 32 amplifies the pulses, for example, to an energy of approximately 1 mJ.

Returning to the dispersive expansion and spectral windowing stage, the spatial and temporal expansion is provided by a pair of anti-parallel gratings 36 and 38 with lenses 40 and 42 which collimate the dispersed beam and pass it in collimated form to mirrors 44 and 46 which return the beam after spectral windowing to the first grating 36 through a second, vertically displaced path through the expansion stage 20.

In the event that controlled temporal delay between the two or more, discrete frequency pulses, which are combined into the output pulse is desired, an optical delay element, such as a plate of glass 48 may be disposed in front of one of the windows, such as the window 24. The use of this optical delay element is optional. In most applications, both spatial and temporal overlap of the frequency-component pulses derived from the same chirped pulse is desired, and the delay element is not used.

The spatial profiling stage 34 receives input pulses through a Pockels cell system and extracts or switches out pulses through another Pockels cell system. Only the seeding Pockels cell (PC) system is shown at 50 and the PC of the switch out system at 52 to simplify the illustration. The seeding PC system may include a Pockels cell driver which is synchronized to both the 100 MHz pulses which drive the mode locked oscillator 12 and the flashlamp trigger of amplifier 32. The Pockels cell is electrically activated for a time period not exceeding the optical round trip time of oscillator 12. The different frequency component pulses enter stage 34 sequentially but during one and the same opening period of the seeding Pockel cell 50. In this connection, it will be appreciated that more than two pulses may be amplified at the same time. Each pulse's spatial profile is shaped so as to be identical because of the characteristics of the amplifier 32. The switch-out occurs when the pulses reach a threshold energy monitored by a detector. Then, the switch-out PC 52 is enabled, for example, by a circuit, including a photo-diode (not shown) detector exposed to a small fraction of the intensity of the pulses as they pass back and forth in the amplifier cavity. The temporal length of the pulse driving PC 52 is set to be no longer than the optical round trip time through the amplifier cavity. The detector may be set to either monitor the intensity of just one of the different frequency component pulses (with the help of a grating dispersive element and a lens) or to monitor the integrated intensity of all frequency-component pulses without frequency discrimination.

Although the shape of the beam is generally elliptical at the mask 22 as shown in FIG. 3B, the lenses 40 and 42 restore the beam to circular cross-sectional shape and the pulses are projected as a single beam through the seeding PC 50 into the cavity of the regenerative amplifier 32. The expanded duration of the pulses, which are amplified, allows more efficient extraction of energy in the amplifier 32, then would be the case if pulse expansion was not employed. The regenerative amplifier supplies pulses containing different frequency components and of identical Gaussian spatial shape, across their frequency spectrum, to a compression stage 54. The regenerative amplifier 32 may be a pulsed regenerative amplifier of known design and the grating compressor 54 may be a double grating compressor of known design, both as described in an article by D. Strickland et al. in Optics Communications, Volume 56, No. 3, Pages 219 to 222 (Dec. 1, 1985). Still further information as to the design of regenerative laser amplifiers and Pockels cell units for seeding and switching out pulses therefrom will be found in U.S. Pat. No. 4,896,119 issued Jan. 23, 1990 and the references cited therein.

The compression stage 54 temporally overlaps the pulses derived from the stage 34 into an output comprising one or more pulses of pico-second duration. The amount of compression depends upon the amount of expansion which in turn is determined by the spacing of the gratings in the expansion stage 20. A suitable period for the gratings, in the expansion stage and in the compression stage, is approximately 1700 lines per mm.

The amplifier 32 provides a high spatial quality pulse. An additional spatial filter 56 may be used at the entrance to the compression stage to further improve the spatial quality (filter any spatial variations in the intensity profile of the beam). The double-pass parallel grating compressor 54, as shown in FIG. 2 may be designed to compress the expanded pulse in accordance with the techniques known in the art for optical pulse compression with diffraction gratings. See e.g. Treacy, IEEE J. Quantum Electronics, QE-5, 454–458 (1969). Since the overlapped pulses are identical, the spatial profile of the output pulses is highly reproducible from pulse to pulse. In the event that an optical delay element (48 FIG. 2) is not used, the frequency component pulses are also in exact overlapped relationship temporally. Because of losses during compression, the one 1 mJ pulse reaching the output is reduced in energy in the embodiment shown in FIG. 2 to approximately 0.3 mJ.

From the foregoing description, it will be apparent that there has been provided an improved system for generating ultra-short pulses of high intensity containing selected frequency components which are overlapped spatially and, if desired, are also overlapped temporally. Variations and modifications of the herein described system within the scope of the invention will undoubtedly suggest themselves to those skilled in the art. Accordingly, the foregoing description shall be taken as illustrative and not in a limiting sense.

We claim:

1. A chirped pulse laser system which provides a short laser pulse having a plurality of discrete frequency components which are spatially overlapped and are in predetermined temporal relationship with each other, which system comprises means for generating chirped laser pulses having a bandwidth which includes the bandwidth of said frequency components, first means for optically Processing said chirped pulses to derive from each of said chirped pulses, a plurality of pulses each having a different one of said frequency components exclusively of the other frequencies in said bandwidth, second means for optically processing said pulses from said first means such that each of said plurality of pulses has the identical spatial profile, and third means for optically processing said plurality of pulses from said second means for compression thereof into said short pulse wherein said plurality of pulses are in spatially overlapped relationship and in said predetermined temporal relationship.

2. The system according to claim 1 wherein said second means includes means for providing output pulses containing said frequency components which are identical in profile, both spatially and temporally.

3. The system according to claim 2 wherein said second means comprises a regenerative laser amplifier having a gain medium with a gain center frequency.

4. The system according to claim 1 wherein said first means includes means for providing pulses in said plurality of pulses which are of higher and lower frequencies disposed symmetrically about said gain center frequency.

5. The system according to claim 4 wherein said regenerative amplifier has a gain characteristic with respect to frequency which is symmetrical about said gain center frequency.

6. The system according to claim 5 wherein said gain characteristic is Gaussian in shape.

7. The system according to claim 1 wherein said first means comprises means for dispersing said chirped pulses to provide a spatial profile over which the bandwidth of said pulses is uniquely spread across an area, and a mask for transmitting said plurality of pulses having windows in spatial relationship corresponding to said frequency components of said pulses in said plurality of pulses.

8. The system according to claim 7 wherein at least one of said windows have an optical delay element in the vicinity thereof through which light passes for providing one of said plurality of pulses having a frequency component corresponding to the location of one of said windows in delayed relationship with respect to others of said pulses.

9. The system according to claim 7 wherein said dispersing means comprises means for expanding the duration of each of said chirped pulses.

10. The system according to claim 7 wherein said dispersing means comprises a plurality of gratings and at least one reflecting element disposed in double pass relationship, said mask being disposed in the path of light toward said reflecting mirror.

11. The system according to claim 10 wherein said gratings and reflector define a stage for expanding the duration of said chirped laser pulses in time and said plurality of gratings are a first reflection grating and a second reflection grating disposed in anti-parallel relationship and spaced from each other, at least one lens between said gratings, said one mirror and another mirror being disposed for returning said pulses from said second grating back to said second grating and then to said first grating and thence to said second means.

12. The system according to claim 11 wherein said second means is a regenerative laser amplifier which is seeded by said pulses from said first grating.

13. The system according to claim 12 wherein said third means is a pulse compression stage for compressing said pulses into ultra short (10 ps duration range to 1 fs duration range) pulses.

14. The system according to claim 13 wherein said compression stage includes a pair of parallel gratings and a reflecting element disposed in double pass relationship.

15. The system according to claim 1 wherein said third means is a pulse compression stage for compressing said pulses into ultra short (10 ps duration range to 1 fs duration range) pulses.

16. The system according to claim 15 wherein said compression stage includes a pair of gratings and a mirror disposed in double pass relationship.

17. The system according to claim 1 wherein said second means includes means for providing output pulses containing said frequency components which are identical in spatial profile and differ in a preselected amount in intensity.

18. The system according to claim 4 wherein said frequency components are disposed in fixed, asymmetric relationship about said gain center frequency.

* * * * *